US007167905B2

(12) United States Patent
Tosey

(10) Patent No.: US 7,167,905 B2
(45) Date of Patent: Jan. 23, 2007

(54) TOKEN-BASED WEB BROWSING WITH VISUAL FEEDBACK OF DISCLOSURE

(75) Inventor: Joseph P. R. Tosey, North Vancouver (CA)

(73) Assignee: Sierra Wireless, Inc., Richmond (CA)

( * ) Notice: Subject to any disclaimer, the term of this patent is extended or adjusted under 35 U.S.C. 154(b) by 826 days.

(21) Appl. No.: 10/355,719

(22) Filed: Jan. 31, 2003

(65) Prior Publication Data

US 2004/0153527 A1 Aug. 5, 2004

(51) Int. Cl.
*G06F 15/16* (2006.01)

(52) U.S. Cl. .................................... 709/218

(58) Field of Classification Search ............... 709/218, 709/203
See application file for complete search history.

(56) References Cited

U.S. PATENT DOCUMENTS

| 5,953,541 | A | 9/1999 | King et al. ............... 395/887 |
| 6,212,518 | B1 * | 4/2001 | Yoshida et al. ............. 707/5 |
| 6,324,566 | B1 | 11/2001 | Himmel et al. ........... 709/203 |
| 6,381,599 | B1 * | 4/2002 | Jones et al. ................. 707/5 |
| 6,490,575 | B1 * | 12/2002 | Berstis ....................... 707/3 |
| 6,732,105 | B1 * | 5/2004 | Watson et al. ............. 707/10 |
| 6,742,018 | B1 * | 5/2004 | Song et al. ................ 709/212 |
| 6,801,851 | B1 * | 10/2004 | Kawakami ................. 701/209 |
| 6,983,310 | B1 * | 1/2006 | Rouse et al. .............. 709/206 |
| 7,091,851 | B1 * | 8/2006 | Mason et al. .......... 340/539.13 |
| 7,103,550 | B1 * | 9/2006 | Gallagher et al. ....... 704/270.1 |

| 2002/0021311 | A1 | 2/2002 | Shechter et al. ............ 345/864 |
| 2002/0078192 | A1 | 6/2002 | Kopsell et al. ............. 709/223 |
| 2002/0095651 | A1 | 7/2002 | Kumar et al. .............. 717/104 |
| 2002/0174118 | A1 | 11/2002 | Bates et al. ................... 707/4 |

FOREIGN PATENT DOCUMENTS

| EP | 0 951 158 | 4/1999 |
| EP | 1 020 804 | 1/2000 |
| WO | 02/35336 | 10/2000 |
| WO | 02/09302 | 7/2001 |

(Continued)

OTHER PUBLICATIONS

Microsoft Corporation, "Smart Tag Installation and Security for Microsoft Office XP", Oct. 2001, pp. 1-9.

(Continued)

Primary Examiner—David Y. Eng
(74) Attorney, Agent, or Firm—Thelen Reid & Priest LLP

(57) ABSTRACT

A data communications network may be browsed using one or more tokens by receiving an input keyword string from a user, determining whether there is a match between the input keyword string and a database of keyword strings, determining a category of the keyword string, rendering to the user at least one service identifier associated with the category, receiving a user-selected service identifier in response to the rendering, substituting at least one variable in a resource locator template associated with the service with a string based at least in part on the keyword string entered by the user and launching the resource locator. According to one aspect, a special rendering of a hyperlink corresponding to the resource locator is used to indicate private data will be disclosed upon launching the resource locator.

25 Claims, 17 Drawing Sheets

FOREIGN PATENT DOCUMENTS

WO     WO 02/09302 A1     1/2002
WO     WO 02/35336 A1     5/2002

OTHER PUBLICATIONS

Paul Cornell, "*Office XP Smart Tag DLLs*", May 2001, pp. 1-4.

Kathy Ivens, "*Office XP Smart Tags*", pp. 1-3.

Wen-Syan Li et al., "*PowerBookmarks: a system for personlizeable Web information organization, sharing, and management*", 1999, Elsevier Science B.V., pp. 1376-1389.

International Search Report, PCT/CA2004/000140, International filing date Jan 30, 2004.

Partial Search Report, PCT/CA2004/000140, Jan. 30, 2004, Search Report mailed Jul. 23, 2004.

Li, et al., "*PowerBookmarks: A System for Personalizable Web Information Organization, Sharing, and Management*", 1999, Computer Networks 31, pp. 1375-1389.

\* cited by examiner

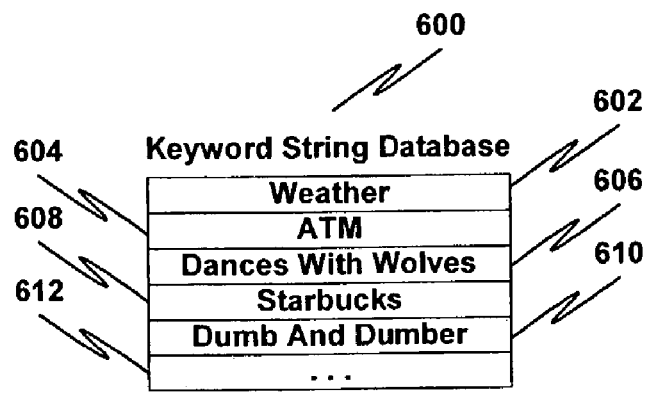
FIG. 6A
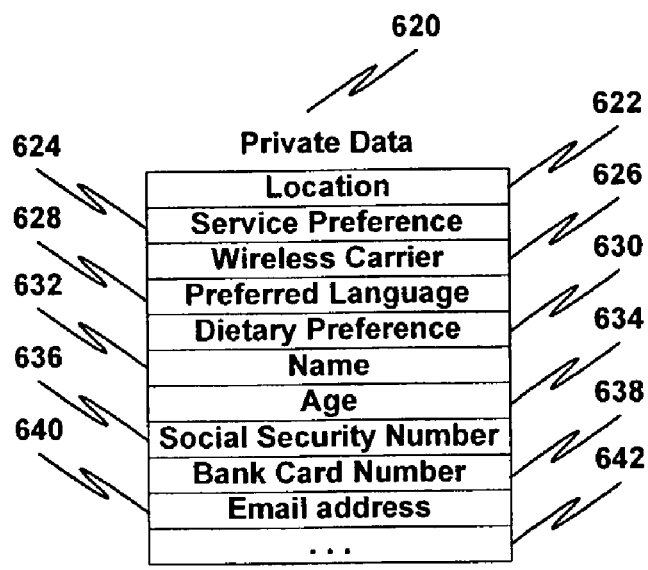
FIG. 6B
FIG. 6

700            702            704 http://www.xyzservices.com/keyword_string=%keyword_string%/attribute=%private data inserted by user device%

Brand Resource Locator Template Database

| Service Name | Resource Locator Template |
|---|---|
| Closest | http://www.brandservices.com/keyword_string=%keyword_string%/closest_to=%user_location% |
| Review | http://www.brandservices.com/keyword_string=%keyword_string%/review_of=%user_location% |
| News | http://www.brandservices.com/keyword_string=%keyword_string%/news_for=%user_location% |
| ... | ... |

Title Resource Locator Template Database

| Service Name | Resource Locator Template |
|---|---|
| Closest | http://www.titleservices.com/keyword_string=%keyword_string%/closest_to=%user_location% |
| Review | http://www.titleservices.com/keyword_string=%keyword_string%/review_of=%user_location% |
| News | http://www.titleservices.com/keyword_string=%keyword_string%/news_for=%user_location% |
| ... | ... |

Generic Resource Locator Template Database

| Service Name | Resource Locator Template |
|---|---|
| Closest | http://www.genericservices.com/keyword_string=%keyword_string%/closest_to=%user_location% |
| Review | http://www.genericservices.com/keyword_string=%keyword_string%/review_of=%user_location% |
| News | http://www.genericservices.com/keyword_string=%keyword_string%/news_for=%user_location% |
| ... | ... |

Single-Service Object Resource Locator Template Database

| Keyword String | Resource Locator Template |
|---|---|
| Weather | http://www.weatherservices.com/closest_to=%user_location% |
| ATM | http://www.ATMservices.com/closest_to=%user_location% |
| ... | ... |

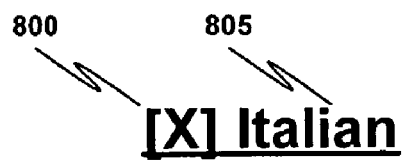
FIG. 8A
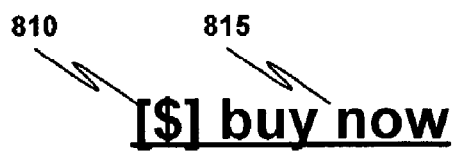
FIG. 8B
FIG. 8C
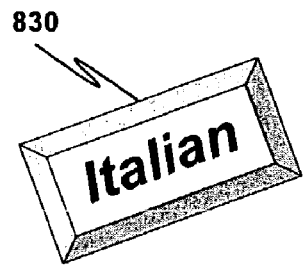
FIG. 8D
FIG. 8

1200  1205 1210 1215

<a href="http://www.restaurant.com/italian/%city%">Italian</a>

FIG. 12A 1220  1225

[Vancouver.BC.CA] Italian

FIG. 12B 1230  1235

[Vancouver] Italian

FIG. 12C 1240  1245

[Main St] Italian

FIG. 12D 1250  1255

[Earth] Italian

TOKEN-BASED WEB BROWSING WITH VISUAL FEEDBACK OF DISCLOSURE

FIELD OF THE INVENTION

The present invention relates to the field of computer science. More particularly, the present invention relates to a method and apparatus for token-based Web browsing with visual feedback of disclosure.

BACKGROUND OF THE INVENTION

The ability to quickly access information about various services is important to the typical user of a wireless user device such as a mobile phone or a personal data assistant (PDA). Such a user typically accesses information by entering the name of the item for which information is desired. For example, a user desiring to find a movie review for a film entitled "Dances with Wolves" would enter the keyword string "Dances with Wolves". The wireless user device must then obtain this information and render it to the user. Some of the information may reside locally on the user device, while other information must be obtained from an external source.

In one solution, the wireless user device periodically communicates with one or more service providers to obtain updates for all information available to the wireless user device. This enables the user to store the entire body of information locally. Unfortunately, this solution requires a relatively large database on a user device. Such a local database typically becomes outdated quickly and is difficult to maintain.

Another solution includes requiring the user search a World Wide Web ("Web") portal for the desired information. Unfortunately, this solution requires the user enter a relatively large amount of text. Furthermore, Web portals typically have a relatively large amount of latency and portal menus typically change frequently, confusing the user.

Additionally, obtaining useful information from an external source such as a service provider often requires disclosing private data. For example, a user desiring weather information for the user's current location must first disclose the location. For various reasons, the user may not want this information disclosed.

Accordingly, a need exists in the prior art for a solution that supports local searching on a device, such that a service is accessible by name. A further need exists for such a solution-that minimizes the amount of text that a user must enter. Yet another need exists for a solution that maintains data on the device as long as possible. A further need exists for such a solution that allows private data to be incorporated into a search on a query-by-query basis, simply and efficiently, but with the user's knowledge and consent. Yet another need exists for such a solution that allows a relatively large amount of content to be stored on a wireless user device.

SUMMARY OF THE INVENTION

A data communications network may be browsed using one or more tokens by receiving an input keyword string from a user, determining whether there is a match between the input keyword string and a database of keyword strings, determining a category of the keyword string, rendering to the user at least one service identifier associated with the category, receiving a user-selected service identifier in response to the rendering, substituting at least one variable in a resource locator template associated with the service with a string based at least in part on the keyword string entered by the user and launching the resource locator. According to one aspect, a special rendering of a hyperlink corresponding to the resource locator is used to indicate private data will be disclosed upon launching the resource locator.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 6A is a block diagram that illustrates a keyword string database in accordance with one embodiment of the present invention.

FIG. 6B is a block diagram that illustrates private data stored on a wireless user device in accordance with one embodiment of the present invention.

FIG. 7A is a block diagram that illustrates a resource locator template in accordance with one embodiment of the present invention.

FIG. 7B is a block diagram that illustrates a brand resource locator template database in accordance with one embodiment of the present invention.

FIG. 7C is a block diagram that illustrates a title resource locator template database in accordance with one embodiment of the present invention.

FIG. 7D is a block diagram that illustrates a generic resource locator template database in accordance with one embodiment of the present invention.

FIG. 7E is a block diagram that illustrates a single service resource locator template database in accordance with one embodiment of the present invention.

FIG. 8A is a block diagram that illustrates a location disclosure icon in accordance with one embodiment of the present invention.

FIG. 8B is a block diagram that illustrates a financial disclosure icon in accordance with one embodiment of the present invention.

FIG. 8C is a block diagram that illustrates a location disclosure rendering in accordance with one embodiment of the present invention.

FIG. 8D is a block diagram that illustrates a location disclosure button in accordance with one embodiment of the present invention.

FIG. 12A is a block diagram of a resource locator that requires private data.

FIG. 12B is a block diagram of a hyperlink that illustrates rendering the resource locator of FIG. 12A as a hyperlink that shows the private data to be disclosed upon user-selection of the hyperlink, in accordance with one embodiment of the present invention.

FIG. 12C is a block diagram of a hyperlink that illustrates rendering the resource locator of FIG. 12A as a hyperlink that shows a transformed version of the private data to be disclosed upon user-selection of the hyperlink, in accordance with one embodiment of the present invention.

FIG. 12D is a block diagram of a hyperlink that illustrates rendering the resource locator of FIG. 12A as a hyperlink that discloses a more specific version of the private data to be disclosed upon user-selection of the hyperlink, in accordance with one embodiment of the present invention.

FIG. 12E is a block diagram of a hyperlink that illustrates rendering the resource locator of FIG. 12A as a hyperlink that discloses a generalized version of the private data to be disclosed upon user-selection of the hyperlink, in accordance with one embodiment of the present invention.

DETAILED DESCRIPTION

Figure 1:
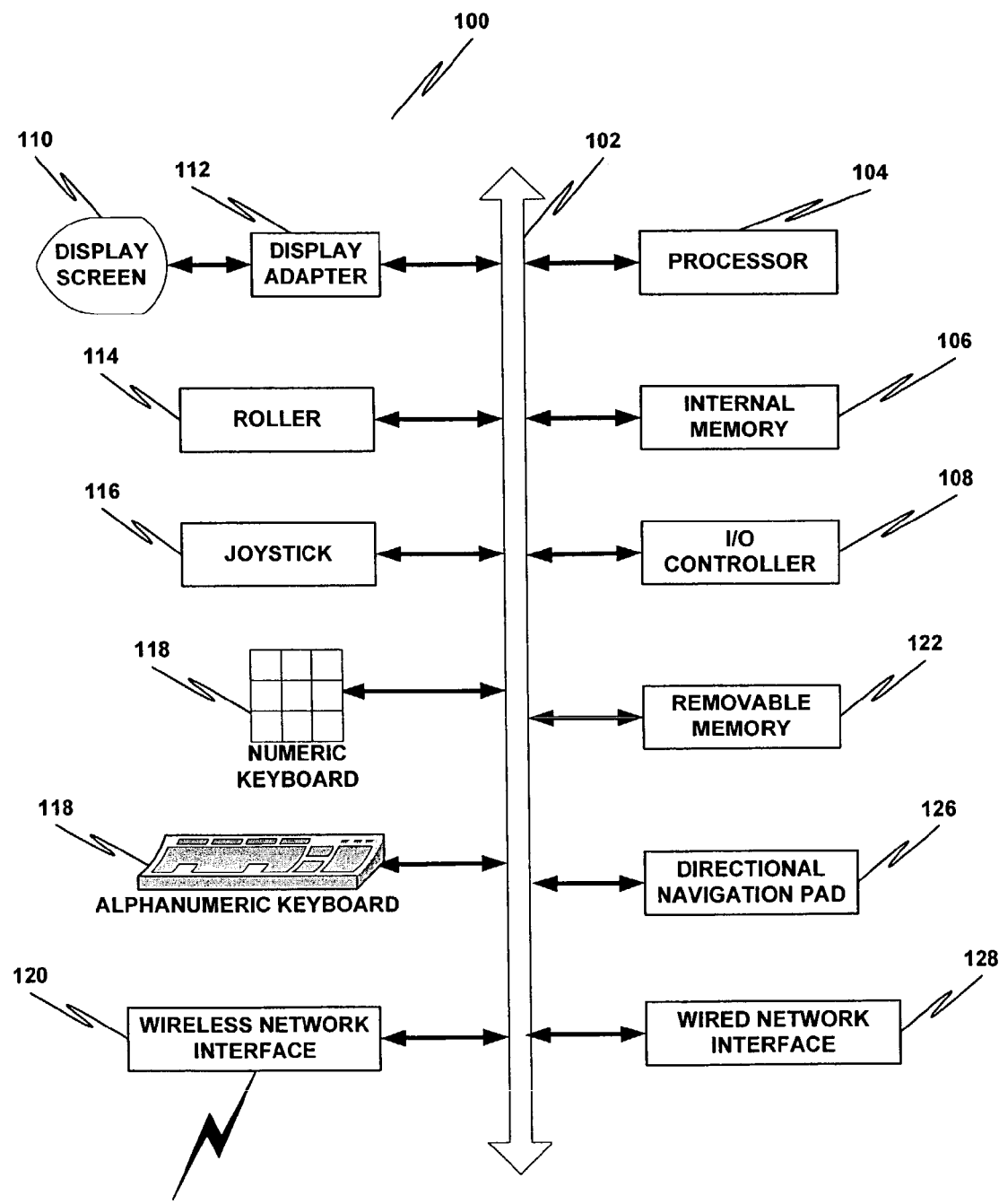
FIG. 1 is a block diagram of a computer system suitable for implementing aspects of the present invention.

Embodiments of the present invention are described herein in the context of a method and apparatus for token-based Web browsing with visual feedback of disclosure. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "wireless user device" includes any device capable of wireless communication and capable of rendering information to a user. The information may be rendered, by way of example, by visual, auditory or tactile means. Exemplary wireless user devices include, by way of example, a personal digital assistant (PDA), a mobile phone, a personal computer, a pager, or the like.

In the context of the present invention, the term "private data" refers to personal information about a user. A user may desire to limit or restrict dissemination or availability of such information. Private data may be unique for a particular individual. A social security number is an example of private data that is unique to a particular individual. Private data may also be non-unique information concerning a particular individual. A language preference of "English" is an example of private but non-unique information concerning a particular individual.

In the context of the present invention, the term "keyword string" refers to one or more keywords comprising one or more characters, which together represent the name of an object or the attributes of an object associated with a service. In accordance with one embodiment of the present invention, a keyword string represents well-known brands, titles and generic categories. Exemplary brands include the keyword strings "Starbucks", "Olive Garden" and "Alpo". Exemplary titles include the keyword strings "Dances with Wolves", "Mission Impossible" and "Harry Potter". Exemplary generic categories include "ATM", "Weather" and "Hospital".

In the context of the present invention, the term "resource locator" or "RL" is defined as an identifier used for accessing a resource. A resource locator may be the name of the resource. A resource locator may also be a Uniform Resource Identifier (URI). More particularly, a resource locator may be a uniform resource locator (URL). URIs and URLs are described in T. Berners-Lee, "Uniform Resource Identifiers (URI): Generic Syntax", Network Working Group Request for Comments: 2396, August 1998. The resource may be an HTML page, an image file, a program such as a common gateway interface application (CGI) or Java™ applet, a text file, a document, or the like.

FIG. 1 depicts a block diagram of a computer system 100 suitable for implementing aspects of the present invention. As shown in FIG. 1, system 100 includes a bus 102 which interconnects major subsystems such as a processor 104, an internal memory 106 (such as a RAM), an input/output (I/O) controller 108, a removable memory (such as a memory card), an external device such as a display screen 110 via display adapter 112, a roller-type input device 114, a joystick 116, a numeric keyboard 118, an alphanumeric keyboard 118, directional navigation pad 126 and a wireless interface 120. Many other devices can be connected. Wireless network interface 120, wired network interface 128, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 1 to be present to practice the present invention. Furthermore, the devices and subsystems may be interconnected in different ways from that shown in FIG. 1. Code to implement the present invention may be operably disposed in internal memory 106 or stored on storage media such as removable memory 122, a floppy disk or a CD-ROM.

Figure 2:
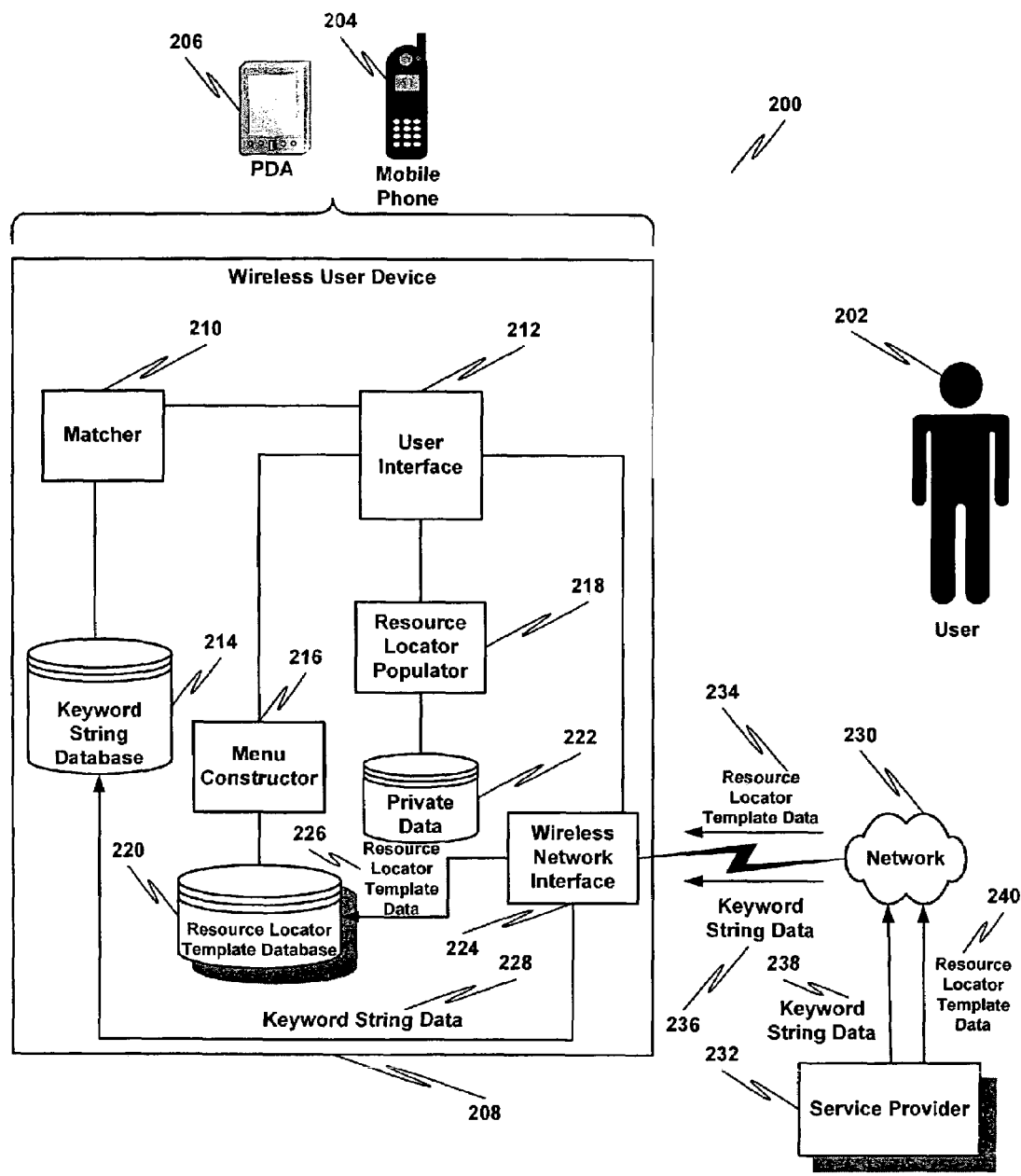
FIG. 2 is a block diagram that illustrates installing one or more databases on a wireless user device in accordance with one embodiment of the present invention.

Turning now to FIG. 2, a block diagram that illustrates installing one or more databases on a wireless user device in accordance with one embodiment of the present invention is presented. Wireless user device 208 includes a user interface 212 configured to receive input from a user 202 and to render digital content to the user 202. Wireless user device 208 also includes a matcher 210 in communication with both the user interface 212 and a keyword string database. Matcher 210 is configured to receive an input keyword string from the user interface 212, and match the input keyword string with one or more other keyword strings in keyword string database 214. Wireless user device 208 also includes a menu constructor 216 configured to receive a keyword string from the matcher 210, determine the category of the keyword string. According to one embodiment of the present invention, the keyword string categories comprise a "brand" category for keyword strings that represent brands, a "title" category for keyword strings that represent titles and a "generic" category for keyword strings that belong to no other category.

Still referring to FIG. 2, menu constructor 216 is configured to use the category to obtain one or more corresponding service identifiers and their associated resource locator template from a resource locator template database 220. Service identifiers and resource locator templates are explained in more detail below with reference to FIG. 7. The menu constructor is also configured to make a list or menu based upon the one or more corresponding service identifiers and provide the menu to user 202 via user interface 212. Wireless user device 208 also includes a resource locator populator 218 configured to receive an indication of the selected service and populate the corresponding resource locator template with the keyword string and the private data stored in private data store 222. Wireless network interface 224 is configured to communicate via network 230 to obtain the corresponding service from one or more service providers 232.

The one or more service providers 232 are configured to initialize wireless user device 208 with a keyword string database 214 and a resource locator template database 220. The information used to populate databases 214 and 220 may be extracted from a memory (not shown in FIG. 2) under the control of the one or more service providers 232.

Many other devices or subsystems (not shown) may be connected in manner similar to that shown in FIG. 2. Also, it is not necessary for all of the devices shown in FIG. 2 to be present to practice the present invention. Furthermore, the devices and subsystems may be interconnected in different ways from that shown in FIG. 2. The operations described with respect to matcher 210, user interface 212, resource locator populator 218, menu constructor 216 and wireless network interface 224 may be combined in various ways. Also, keyword string database 214, resource locator template database 220 and private data store 222 may be combined into a smaller number of databases, or further divided into a larger number of databases. Use of wireless user device 208 is described below in more detail, with reference to FIG. 4.

Figure 3:
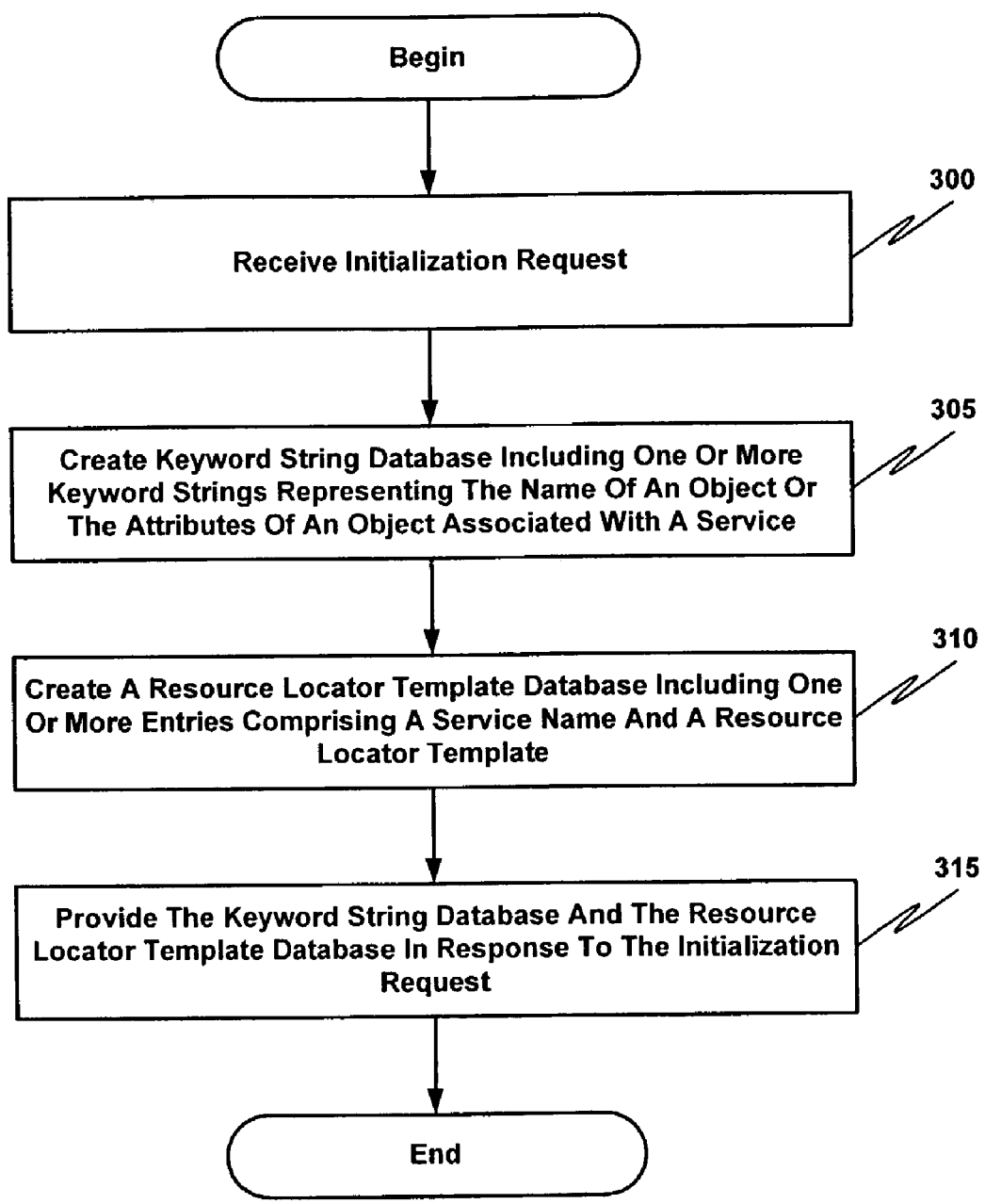
FIG. 3 is a flow diagram that illustrates installing one or more databases for token-based browsing on a wireless user device in accordance with one embodiment of the present invention.

Turning now to FIG. 3, a flow diagram that illustrates installing one or more databases for token-based browsing on a wireless user device in accordance with one embodiment of the present invention is presented. At 300, an initialization request is received. At 305, a keyword string database that includes one or more keyword strings representing the name of an object or the attributes of an object associated with a service is created. At 310, a resource locator template database that includes one or more entries comprising a service name and a resource locator template is created. At 315, the keyword string database and the resource locator template database are provided in response to the initialization request.

Figure 4:
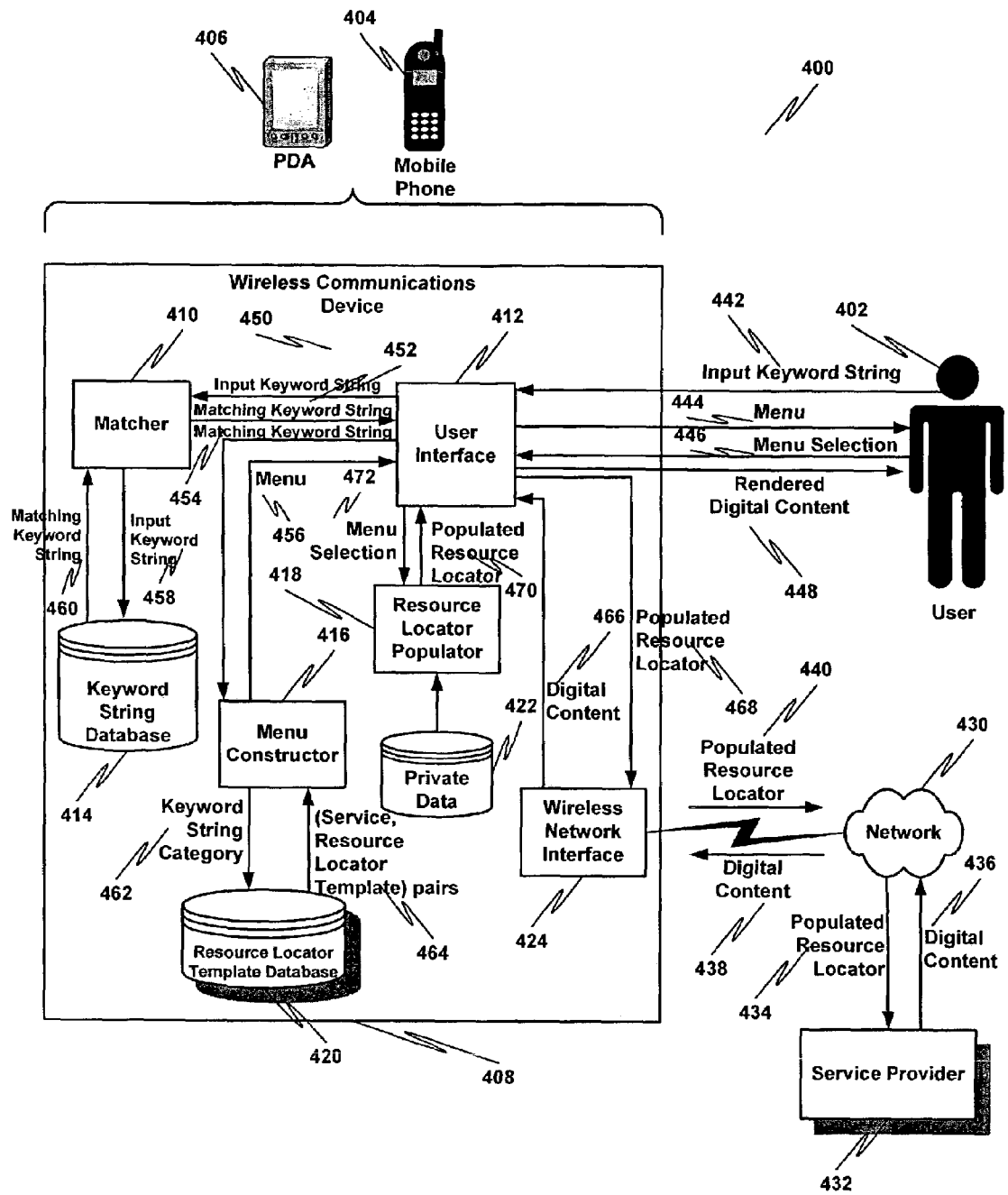
FIG. 4 is a block diagram that illustrates using a wireless user device configured for token-based browsing in accordance with embodiments of the present invention.

Turning now to FIG. 4, a block diagram that illustrates using a wireless user device configured for token-based browsing in accordance with embodiments of the present invention is presented. FIG. 4 illustrates use of wireless user device 408 after it has been initialized as described above with reference to FIG. 2. A user 402 enters an input keyword string comprising one or more keywords comprising one or more characters. User interface 412 receives the input keyword string and sends it to matcher 410. Matcher 410 receives the input keyword string and matches it with one or more other keyword strings in a keyword string database 414.

According to one embodiment of the present invention, matcher 410 is configured to perform predictive matching, indicating a match based on incomplete input when further input cannot reduce the number of possible matches.

Matches may be based on a prefix of a word. By way of example, the keyword string "jo" matches "john" and "jon", but not "mojo".

According to another embodiment of the present invention, matches are based on one or more words in a keyword string, regardless of the order of keywords within the keyword string. By way of example, the keyword string "d jo" matches "doctor john smith" and "john dickenson". In this example, the "d" in "d jo" matches the "doctor" keyword of "doctor john" and the "dickenson" of "john dickenson". And the "jo" in "d jo" matches the "john" in "doctor john" and the "john" in "john dickenson".

According to another embodiment of the present invention, a predetermined set of input characters are translated to the space character prior to performing a match. According to one embodiment of the present invention, the predetermined set of input characters comprises all non-alphanumeric characters. By way of example, the keyword string "d/jo" is translated to the keyword string "d jo", and the keyword string "j.d" is translated to the keyword string "j d". Thus translated, both keyword strings "d/jo" and "j.d" match the keyword string "john dickenson".

Figure 5:
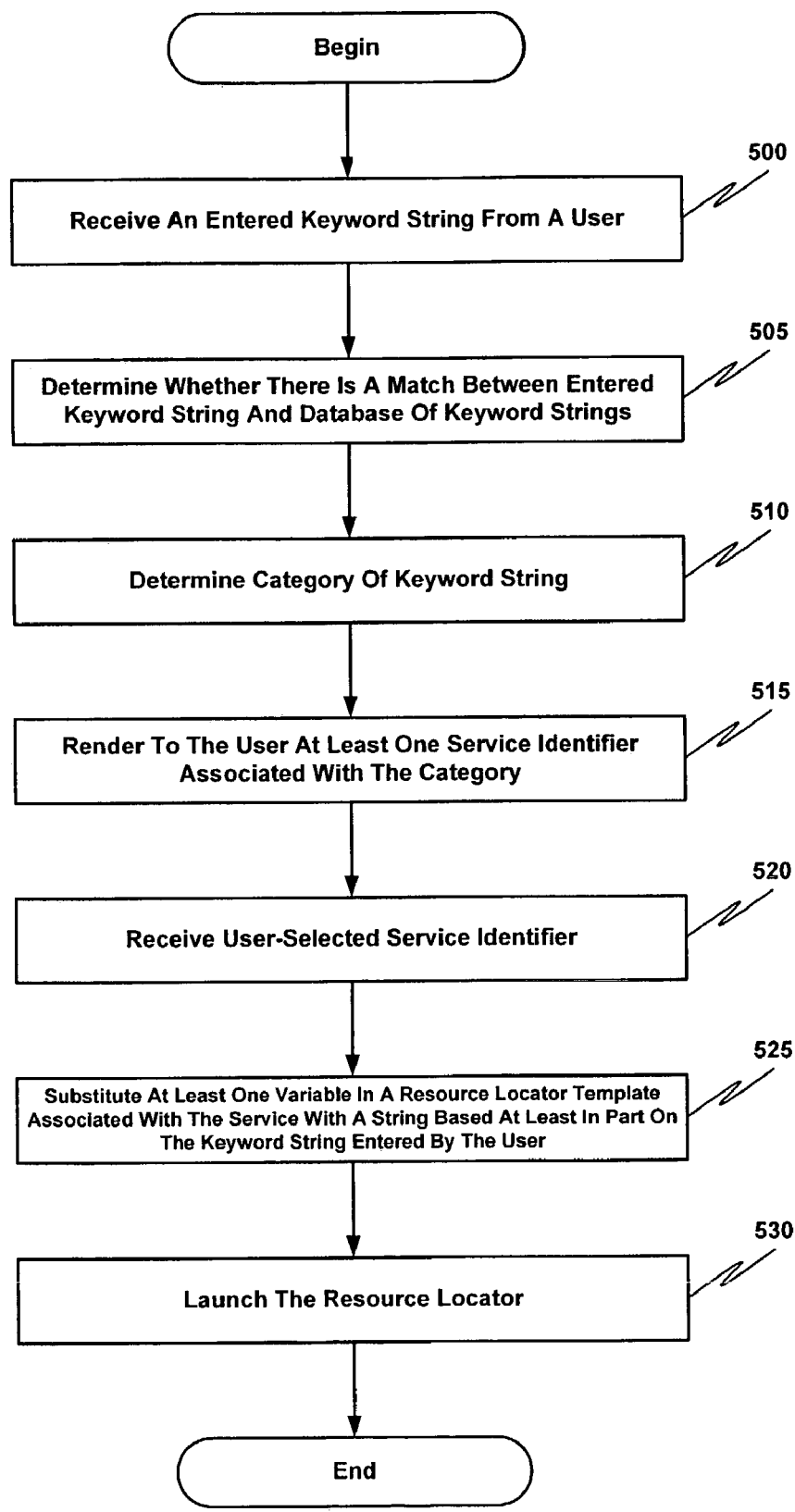
FIG. 5 is a flow diagram that illustrates using a wireless user device configured with a token-based Web browser in accordance with one embodiment of the present invention.

Still referring to FIG. 4, matcher 410 returns a matching keyword string to user interface 412. User interface 412 receives the matching keyword string and communicates it to menu constructor 416. Menu constructor 416 receives the keyword string from the matcher, determines the category of the keyword string and uses the category to obtain one or more corresponding service identifiers and their associated resource locator template from a resource locator template database 220. Menu constructor makes a list or menu based upon the one or more corresponding service identifiers and provides the menu to user 402 via user interface 412. resource locator populator 418 receives an indication of the selected service and populates the corresponding resource locator template with the keyword string and private data if required by the resource locator template. Wireless network interface 466 receives the populated resource locator and communicates via network 430 to obtain a service from at least one service provider Turning now to FIG. 5, a flow diagram that illustrates using a wireless user device configured with a token-based Web browser in accordance with one embodiment of the present invention is presented. At 500, a keyword string from a user is received. At 505, a determination is made regarding whether the received keyword string matches a keyword string in a database of keyword strings. According to one embodiment of the present invention, predictive matching is used to indicate a match based on incomplete input when further input cannot reduce the number of possible matches. At 510, the category of the keyword string is determined. At 515, at least one service identifier associated with the category is rendered to the user. At 520, a user-selected service identifier is received. At 525, at least one variable in a resource locator template associated with the service is substituted with a string based at least in part on the keyword string entered by the user. At 530, the resource locator is launched.

Turning now to FIG. 6A, a block diagram that illustrates a keyword string database in accordance with one embodiment of the present invention is presented. As shown in FIG. 6A, keyword string database 600 comprises one or more keyword strings (602–612). Keyword strings in keyword string database 600 are compared with an input keyword string to determine a match. The keyword strings illustrated in database 600 are for purposes of illustration only. Those of ordinary skill in the art will recognize that many other keyword strings are possible.

Turning now to FIG. 6B, a block diagram that illustrates private data stored on a wireless user device in accordance with one embodiment of the present invention is presented. The exemplary private data shown in FIG. 6B is a user's location 622, service preference 624, wireless carrier 626, preferred language 628, dietary preference 630, name 632, age 634, social security number 636, bank card number 638 and email address 640. The private data illustrated in database 620 are for purposes of illustration only. Those of ordinary skill in the art will recognize that many other private data are possible.

FIGS. 7A–7E illustrate resource locator templates and resource locator template databases in accordance with embodiments of the present invention. FIG. 7A illustrates a resource locator template, and FIGS. 7B–7E illustrate template databases for brands, titles, generic items and single-service objects, respectively. Each entry in the databases of FIGS. 7B–7D includes the name of a service and a resource locator template, while the database of FIG. 7E maps a specific keyword string to a resource locator template.

Figure 9:
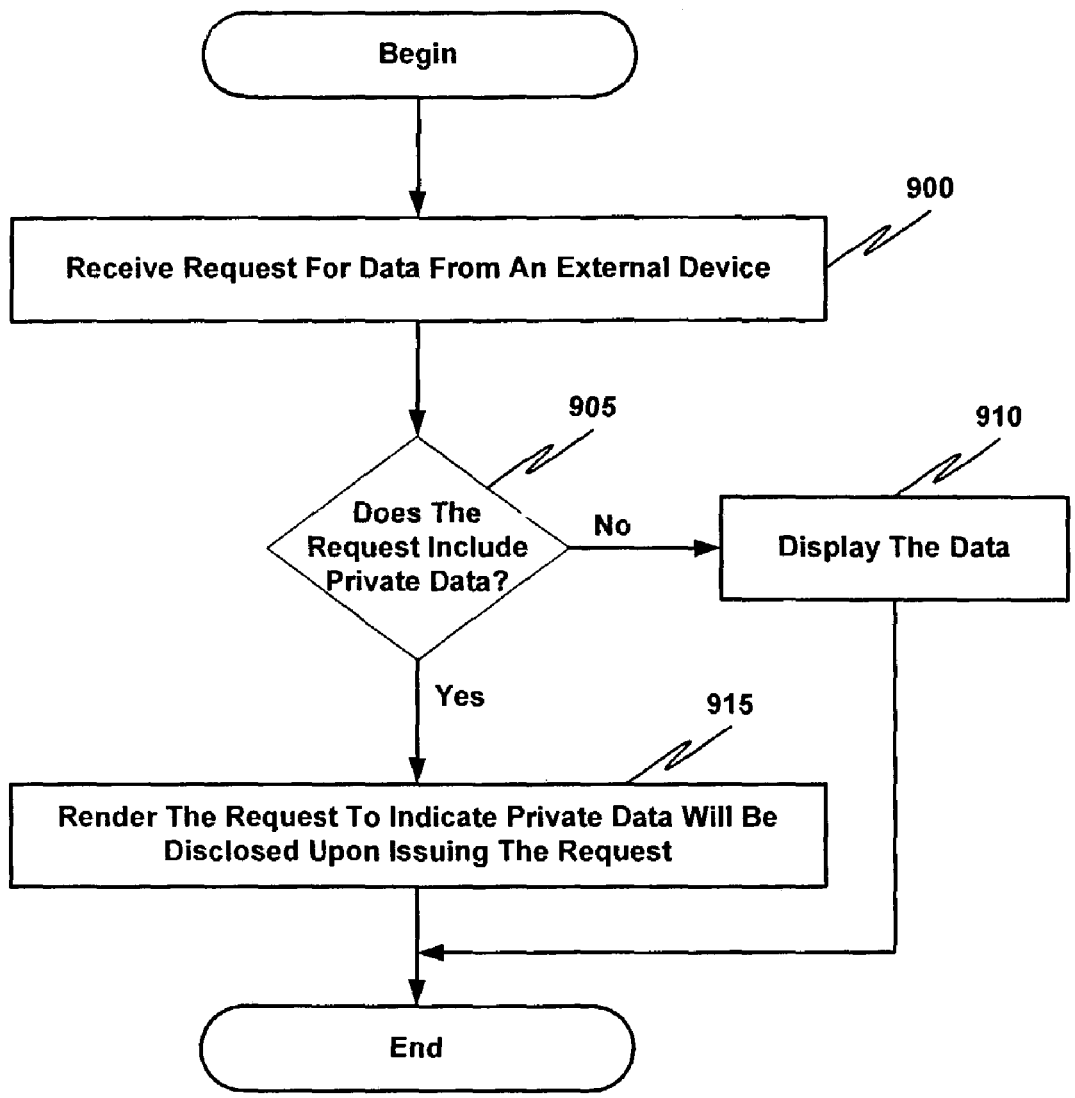
FIG. 9 is a flow diagram that illustrates a method for rendering a request for data from an external device to indicate private data will be disclosed upon issuing the request, in accordance with one embodiment of the present invention.
Figure 10:
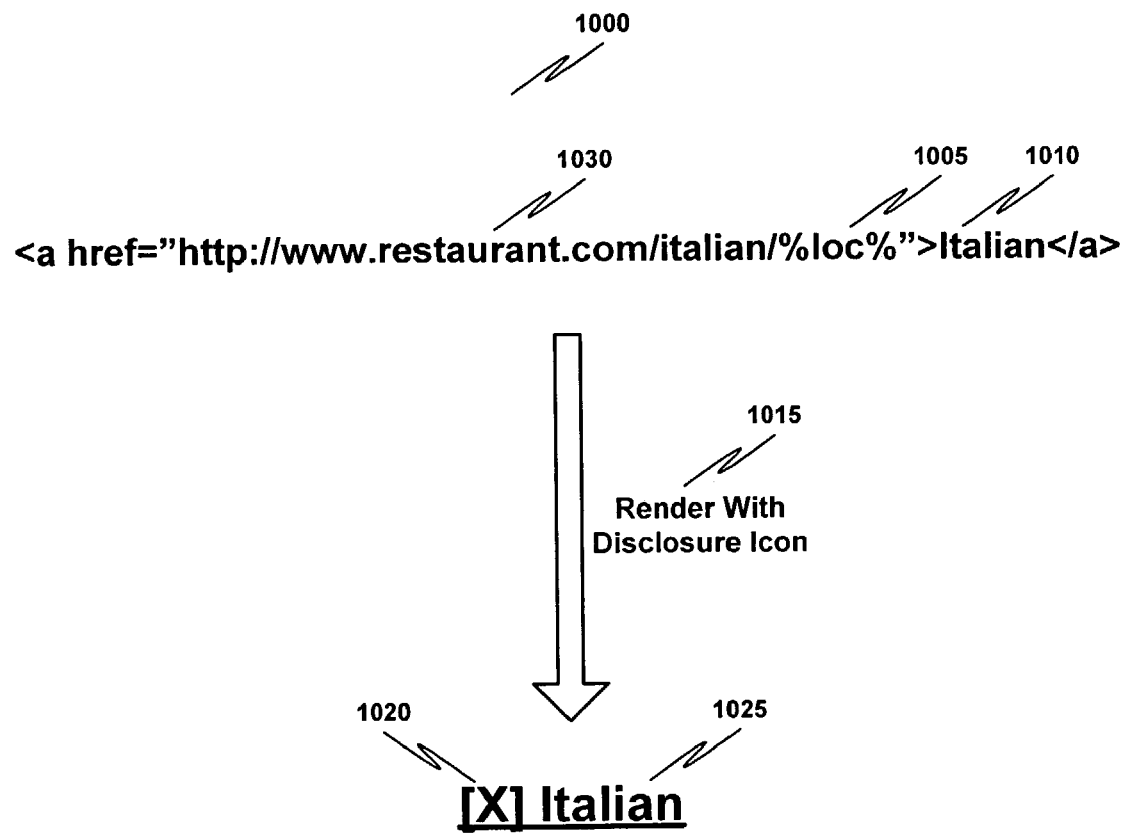
FIG. 10 is a block diagram that illustrates rendering a hyperlink to include a disclosure icon if the corresponding resource locator requires private data, in accordance with one embodiment of the present invention.
Figure 11:
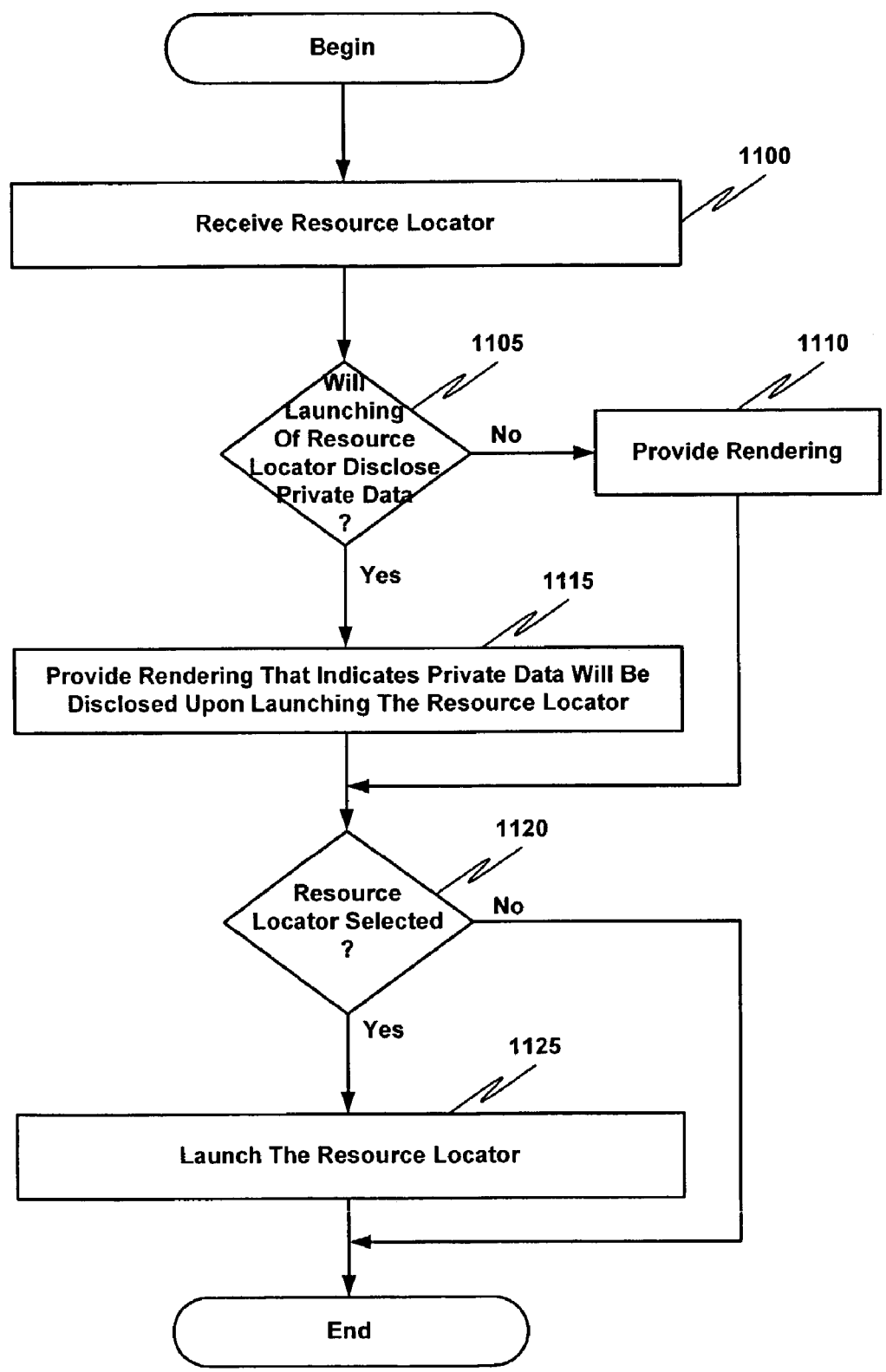
FIG. 11 is flow diagram that illustrates a method for rendering a hyperlink to include a disclosure icon if the resource locator corresponding to the hyperlink requires private data, in accordance with one embodiment of the present invention.
Figure 13:
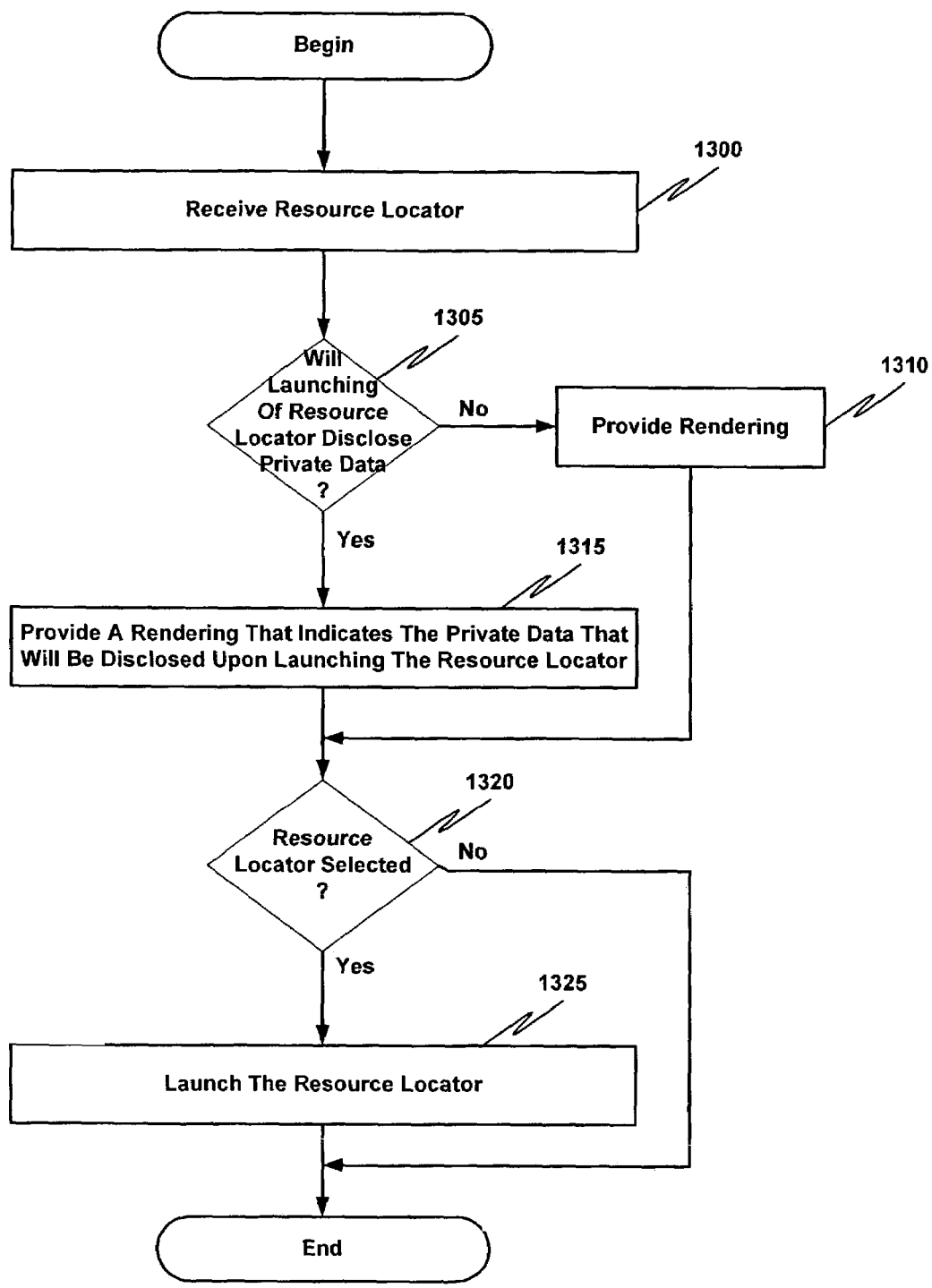
FIG. 13 is a flow diagram that illustrates a method for rendering a hyperlink to indicate the private data that will be disclosed upon launching the resource locator associated with the hyperlink, in accordance with one embodiment of the present invention.
Figure 14:
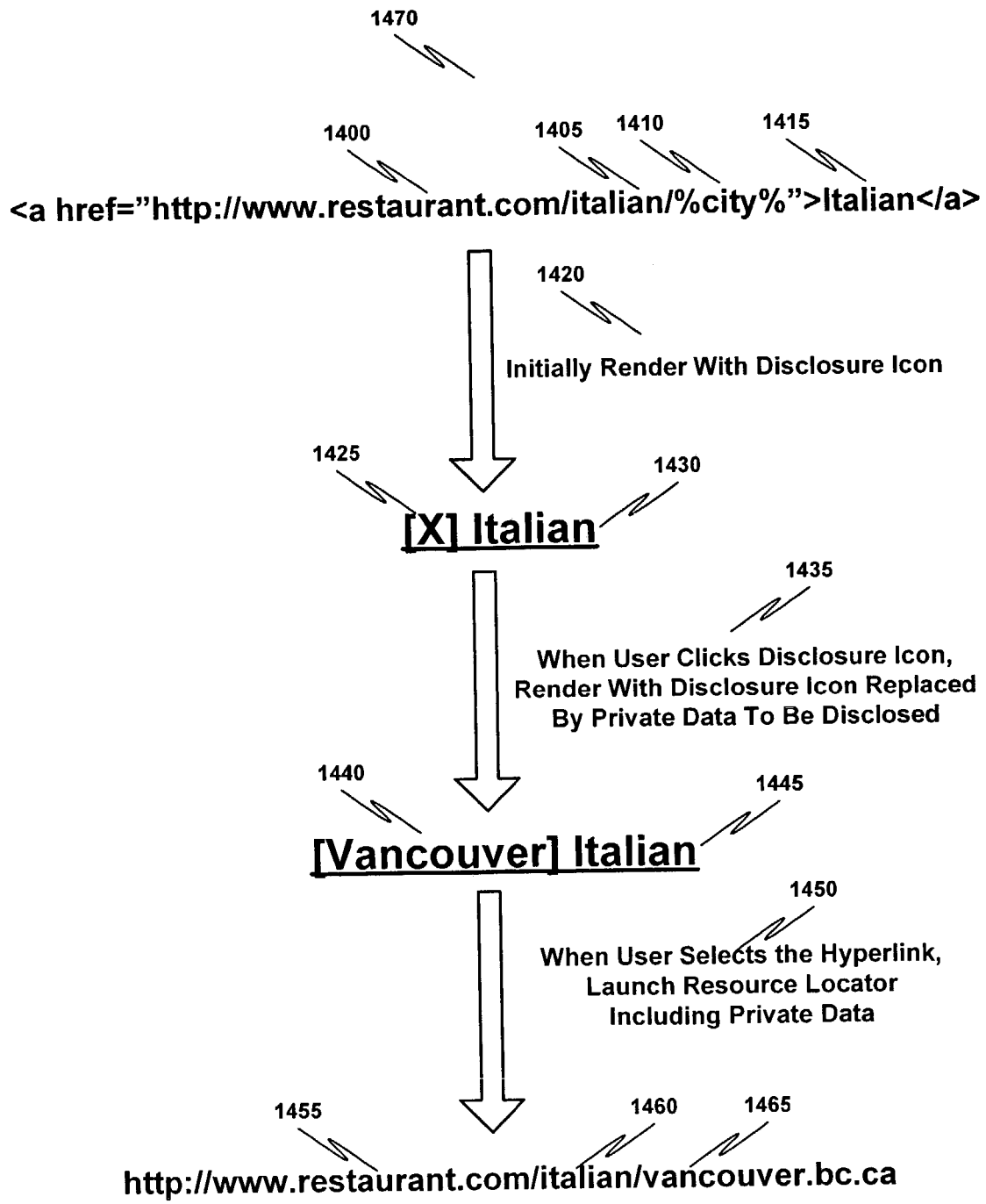
FIG. 14 is a block diagram that illustrates incrementally updating an resource locator to indicate private data to be disclosed upon launching the resource locator, in accordance with one embodiment of the present invention.
Figure 15:
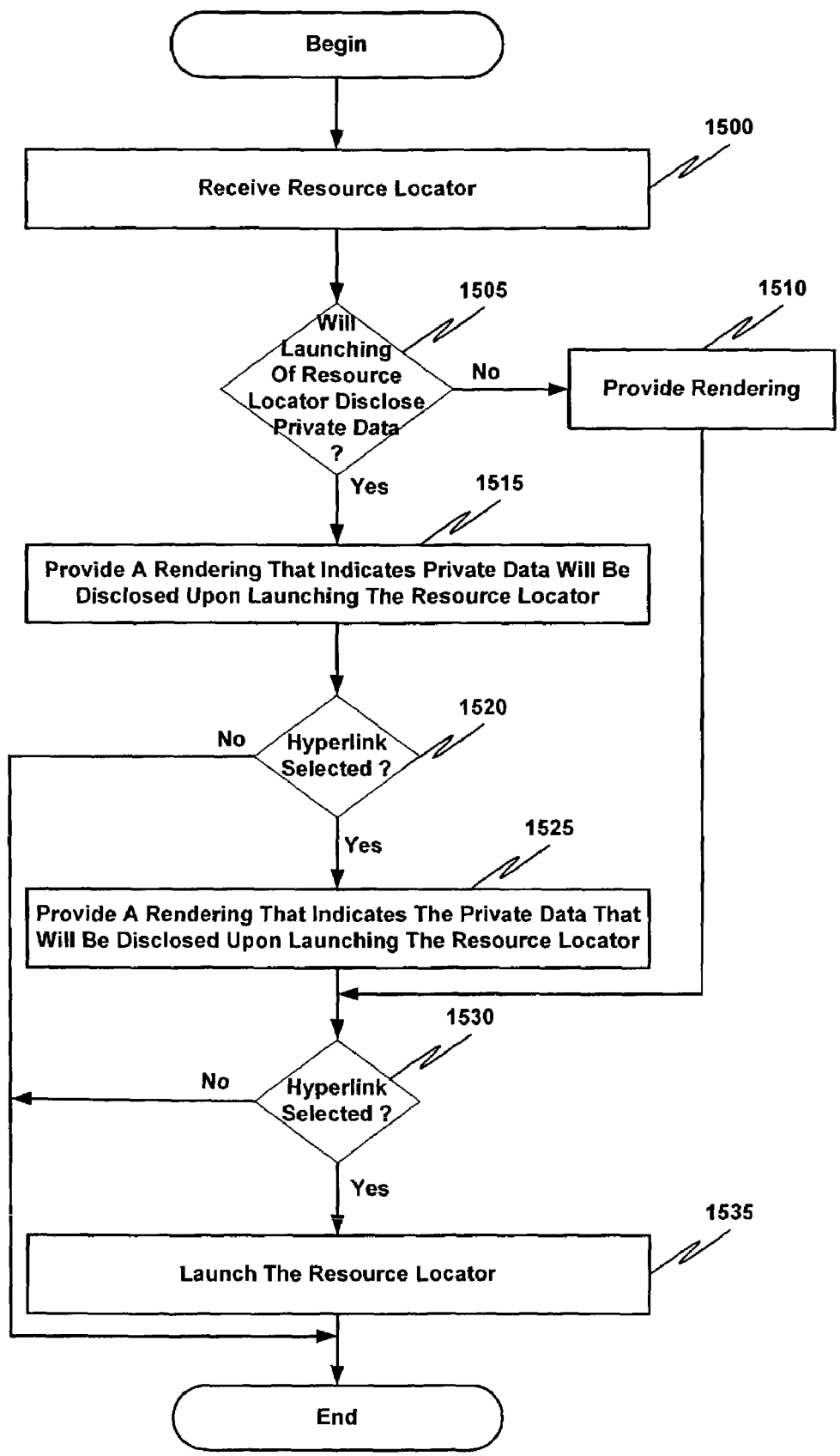
FIG. 15 is a flow diagram that illustrates incrementally updating an resource locator to indicate private data to be disclosed upon launching the resource locator, in accordance with one embodiment of the present invention.
Figure 16:
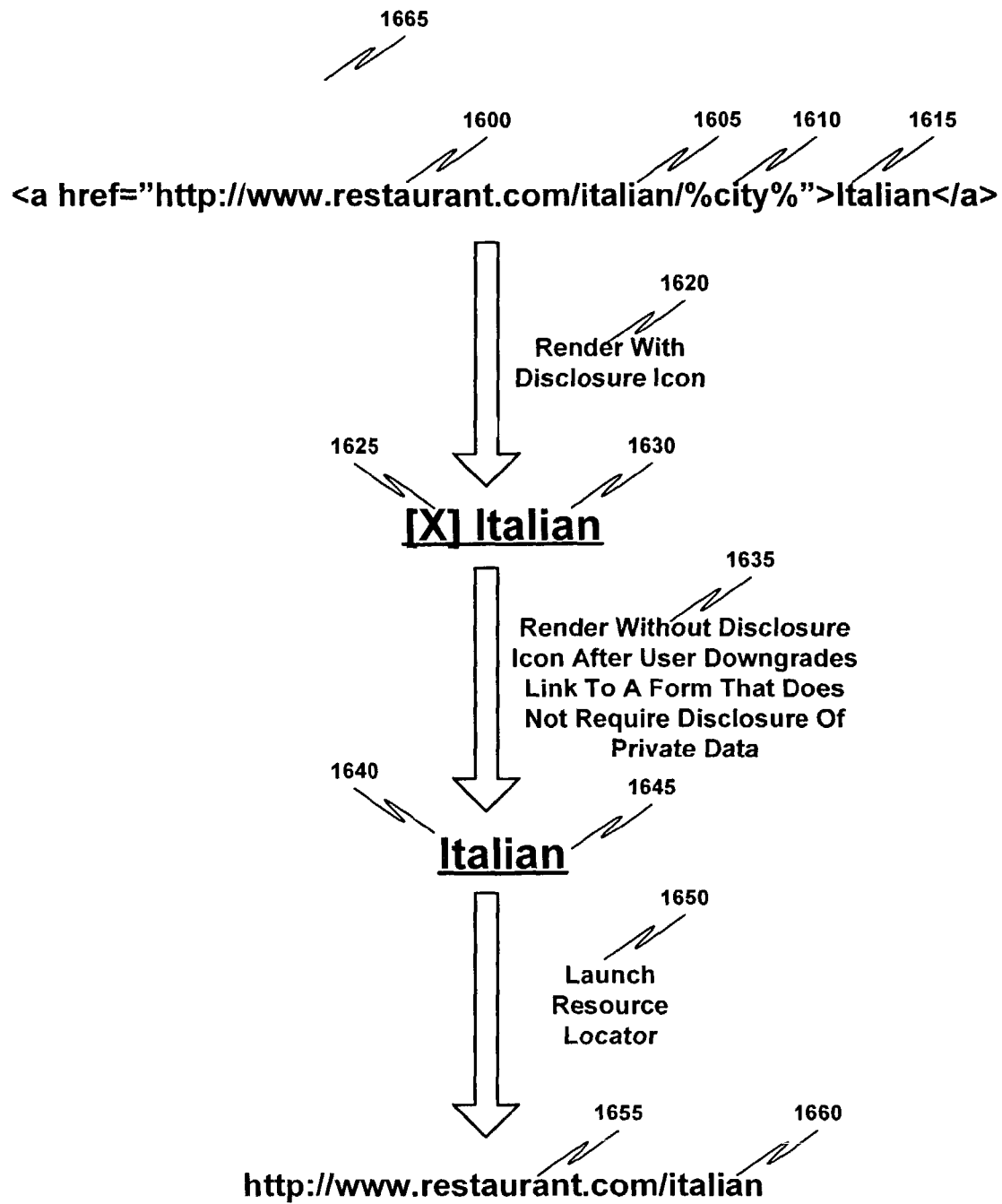
FIG. 16 is a block diagram that illustrates dynamically modifying the amount of private data to be disclosed upon selection of a hyperlink, in accordance with one embodiment of the present invention.
Figure 17:
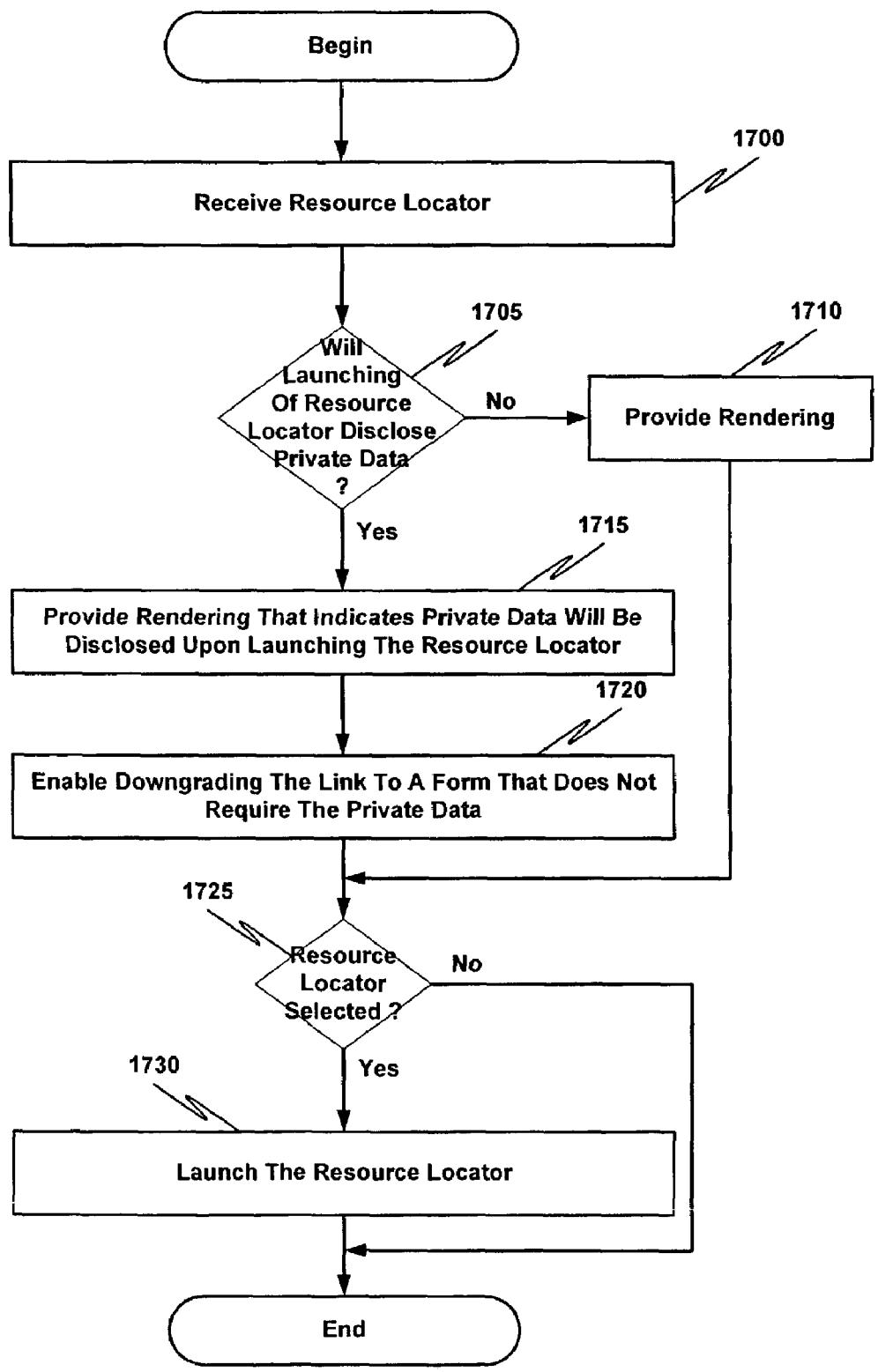
FIG. 17 is a flow diagram that illustrates modifying the amount of private data to be disclosed upon selection of a hyperlink, in accordance with one embodiment of the present invention.

FIGS. 8A–17 illustrate various mechanisms for providing visual feedback of information to be disclosed to an external entity, in accordance with embodiments of the present invention. FIGS. 8A–8D illustrate methods for rendering a hyperlink that indicates private data will be disclosed upon launching the corresponding resource locator. FIG. 9 illustrates rendering a request for data from an external device to indicate private data will be disclosed upon issuing the request. FIGS. 10–11 illustrate rendering a hyperlink to include a disclosure icon if the resource locator corresponding to the hyperlink requires private data. FIGS. 12A–13 illustrate rendering a resource locator as a hyperlink that shows the various levels of detail of private data to be disclosed upon user-selection of the hyperlink. FIGS. 14–15 illustrate incrementally updating a resource locator to indicate private data to be disclosed upon launching the resource locator. FIGS. 16–17 illustrate dynamically modifying the amount of private data to be disclosed upon selection of a hyperlink.

FIGS. 8A and 8B illustrate using a "disclosure icon" to indicate private data will be disclosed upon launching a corresponding resource locator, while FIGS. 8C and 8D use a particular rendering of a hyperlink to make the indication.

Turning now to FIG. 8A, a block diagram that illustrates a location disclosure icon in accordance with one embodiment of the present invention is presented. As shown in FIG. 8A, a location disclosure icon 800 is presented with hyperlink 805 to indicate private data will be disclosed upon selecting the corresponding hyperlink 805. In this case, the private data to be disclosed is the location of the user, allowing a service provider to determine one or more Italian restaurants near the user's current location.

Turning now to FIG. 8B, a block diagram that illustrates a financial disclosure icon in accordance with one embodiment of the present invention is presented. As shown in FIG. 8B, a financial disclosure icon 810 is presented with hyperlink 815 to indicate private data will be disclosed upon selecting the corresponding hyperlink 815. In this case, the private data to be disclosed is the bank card information of the user, allowing a service provider to complete a purchase transaction by debiting the user's account.

Turning now to FIG. 8C, a block diagram that illustrates a location disclosure rendering in accordance with one embodiment of the present invention is presented. As shown in FIG. 8C; the rendering of a hyperlink 820 is modified to indicate private data will be disclosed upon selecting the corresponding hyperlink 820. The particular rendering shown uses the font "Harlow Solid Italic" to indicate the pending disclosure of private data and is for illustrative purposes only. Those of ordinary skill in the art will recognize that many other renderings are possible.

Turning now to FIG. 8D, a block diagram that illustrates a location disclosure button in accordance with one embodiment of the present invention is presented. As shown in FIG. 8D, a location disclosure button is used to indicate private data will be disclosed to indicate private data will be disclosed upon selecting the corresponding hyperlink.

Turning now to FIG. 9, a flow diagram that illustrates a method for rendering a request for data from an external device to indicate private data will be disclosed upon issuing the request, in accordance with one embodiment of the present invention is presented. At 900, a request for data from an external device is received. At 905, a determination is made regarding whether the request includes private data. If the request does not include private data, the requested data is displayed at 910. If the request includes private data, the request is rendered to indicate private data will be disclosed upon issuing the request.

Turning now to FIG. 10, a block diagram that illustrates rendering a hyperlink to include a disclosure icon if the corresponding resource locator requires private data, in accordance with one embodiment of the present invention is presented. As shown in FIG. 10, resource locator 1000 includes a reference to a location variable 1005. Upon launching resource locator 1000, location variable 1005 is replaced with the location of a user, thus disclosing the user's location. According to one embodiment of the present invention, the user is made aware of the potential disclosure of private data by automatically rendering a hyperlink with a disclosure icon 1020 when launching the resource locator 1000 will require disclosure of private data 1005. As shown in FIG. 10, resource locator 1000 is automatically rendered as a hyperlink 1025 that includes a disclosure icon 1020.

Turning now to FIG. 11, flow diagram that illustrates a method for rendering a hyperlink to include a disclosure icon if the resource locator corresponding to the hyperlink requires private data, in accordance with one embodiment of the present invention is presented. At 1100, a resource locator is received. At 1105, a determination is made regarding whether launching the resource locator will disclose private data. If launching the resource locator will not disclose private data, at 1110 a rendering is provided. If launching the resource locator will disclose private data, at 1115 a rendering that indicates private data will be disclosed upon launching the resource locator is provided. At 1120, a determination is made regarding whether the resource locator has been selected. If the resource locator has been selected, it is launched at 1125.

FIGS. 12A–12E illustrate automatically updating a hyperlink to indicate private data to be disclosed upon user-selection of the hyperlink in accordance with embodiments of the present invention. FIG. 12A illustrates a resource locator that requires private data (city). FIG. 12B illustrates rendering the resource locator of FIG. 12A as a hyperlink 1225 that shows the private data (1220) to be disclosed upon user-selection of the hyperlink 1225. Here, the disclosure icon 1220 indicates the location "Vancouver.BC.CA" will be disclosed upon user-selection of the hyperlink 1225. FIG. 12C illustrates rendering the resource locator of FIG. 12A as a hyperlink 1235 that shows a transformed version of the private data (1230) to be disclosed upon user-selection of the hyperlink 1235. Here, the disclosure icon 1230 indicates the location "Vancouver" will be disclosed upon user-selection of the hyperlink 1235. FIG. 12D illustrates rendering the resource locator of FIG. 12A as a hyperlink 1245 that discloses a more specific version of the private data (1240) to be disclosed upon user-selection of the hyperlink 1245. Here, the disclosure icon 1240 indicates the location "Main St" will be disclosed upon user-selection of the hyperlink 1245. FIG. 12E illustrates rendering the resource locator of FIG. 12A as a hyperlink 1255 that discloses a generalized version of the private data (1250) to be disclosed upon user-selection of the hyperlink 1255. Here, the disclosure icon 1250 indicates the location "Earth" will be disclosed upon user-selection of the hyperlink 1255.

Turning now to FIG. 13, a flow diagram that illustrates a method for rendering a hyperlink to indicate the private data that will be disclosed upon launching the resource locator associated with the hyperlink, in accordance with one embodiment of the present invention is presented. At 1300, a resource locator is received. At 1305, a determination is made regarding whether launching the resource locator will disclose private data. If launching the resource locator will not disclose private data, a rendering is provided at 1310. If launching the resource locator will disclose private data, at 1315 a rendering that indicates the private data that will be disclosed upon launching the resource locator is provided. At 1320, a determination is made regarding whether the resource locator was selected. If the resource locator was selected, at 1325 the resource locator is launched.

Turning now to FIG. 14, a block diagram that illustrates incrementally updating a resource locator to indicate private data to be disclosed upon launching the resource locator, in accordance with one embodiment of the present invention is presented. As shown in FIG. 14, a hyperlink based on a resource locator 1470 that requires private data 1410 is initially rendered as a hyperlink 1430 that reveals user-selection of the hyperlink 1430 will require disclosure of private data, without specifying the private data to be disclosed. In this case, icon 1425 indicates location information will be disclosed. Upon user-selection of icon 1425, it is transformed to indicate the actual data to be submitted. In this case, the user's location is Vancouver 1440. Upon user-selection of hyperlink 1445, the associated resource locator including the private data 1465 is launched.

Turning now to FIG. 15, a flow diagram that illustrates incrementally updating a resource locator to indicate private data to be disclosed upon launching the resource locator, in accordance with one embodiment of the present invention is presented. At 1300, a resource locator is received. At 1505, a determination is made regarding whether launching of the resource locator will disclose private data. If launching of the resource locator will not disclose private data, at 1510 a rendering is provided. If launching of the resource locator will disclose private data, at 1515 a rendering that indicates private data will be disclosed upon launching the resource locator is provided. At 1520, a determination is made regarding whether the resource locator has been selected. If the resource locator has been selected, at 1525 a rendering that indicates the private data that will be disclosed upon launching the resource locator is provided. At 1530, a determination is made regarding whether the hyperlink associated with the resource locator has been selected. If the hyperlink has been selected, it is launched at 1535.

Turning now to FIG. 16, a block diagram that illustrates dynamically modifying the amount of private data to be disclosed upon selection of a hyperlink, in accordance with one embodiment of the present invention is presented. As shown in FIG. 16, a hyperlink based on a resource locator 1665 that requires private data 1610 is initially rendered as a hyperlink 1630 that reveals user-selection of the hyperlink 1630 will require disclosure of private data. In this case, icon 1625 indicates location information will be disclosed. At this point, the user is allowed to downgrade the link to a form that does not require disclosure of private data. According to one embodiment of the present invention, the user right-clicks on the hyperlink 1630 and selects from a pop-up property menu a "disable personal information" option or the equivalent. According to another embodiment of the present invention, the user presses a button on a menu-bar for a Window is operative to globally turn off disclosure of personal information. In this case, globally turning of the disclosure of personal information causes the initial resource locator 1630 to be rendered without the disclosure icon.

Turning now to FIG. 17, a flow diagram that illustrates modifying the amount of private data to be disclosed upon selection of a hyperlink, in accordance with one embodiment of the present invention is presented. At 1700, a resource locator is received. At 1705, a determination is made regarding whether launching of the resource locator will disclose private data. If launching of the resource locator will not disclose private data, at 1710 a rendering is provided. If launching of the resource locator will disclose private data, at 1715 a rendering that indicates private data will be disclosed upon launching the resource locator is provided. At 1720, downgrading the link to a form that does not require the private data is enabled. At 1725, a determination is made regarding whether the resource locator has been selected. If the resource locator has been selected, it is launched at 1730.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for initializing a wireless user device, the method comprising:
  receiving an initialization request;
  creating a keyword string database including one or more keyword strings comprising one or more keywords comprising one or more characters, said one or more keyword strings representing the name of an object or the attributes of an object associated with a service;
  creating a resource locator template database including one or more entries comprising a service name and a resource locator template; and
  providing the keyword string database and the resource locator template database in response to said initialization request.

2. A method for browsing a data communications network using one or more tokens, the method comprising:
  receiving an input keyword string from a user, said input keyword string comprising one or more keywords comprising one or more characters;
  determining whether there is a match between said input keyword string and a database of keyword strings;
  determining a category of said keyword string;
  rendering to said user at least one service identifier associated with said category;
  receiving a user-selected service identifier in response to said rendering;
  substituting at least one variable in a resource locator template associated with said service with a string based at least in part on the keyword string entered by the user; and
  launching said resource locator.

3. The method of claim 2 wherein said determining whether there is a match further comprises indicating a match based on incomplete input when further input cannot reduce the number of possible matches.

4. The method of claim 2 wherein said determining whether there is a match further comprises indicating a match if prefixes of keywords in said input keyword string match prefixes of keywords in a keyword string of said database.

5. The method of claim 2 wherein said determining whether there is a match further comprises indicating a match if at least one keyword prefix in said input keyword string matches a corresponding keyword prefix in a keyword string of said database.

6. A method for initializing a wireless user device, the method comprising:
  step for receiving an initialization request;
  step for creating a keyword string database including one or more keyword strings comprising one or more keywords comprising one or more characters, said one or more keyword strings representing the name of an object or the attributes of an object associated with a service;
  step for creating a resource locator template database including one or more entries comprising a service name and a resource locator template; and
  step for providing the keyword string database and the resource locator template database in response to said initialization request.

7. A method for browsing a data communications network using one or more tokens, the method comprising:
  step for receiving an input keyword string from a user, said input keyword string comprising one or more keywords comprising one or more characters;
  step for determining whether there is a match between said input keyword string and a database of keyword strings;
  step for determining a category of said keyword string;
  step for rendering to said user at least one service identifier associated with said category;
  step for receiving a user-selected service identifier in response to said rendering;
  step for substituting at least one variable in a resource locator template associated with said service with a string based at least in part on the keyword string entered by the user; and
  step for launching said resource locator.

8. The method of claim 7 wherein said step for determining whether there is a match further comprises step for indicating a match based on incomplete input when further input cannot reduce the number of possible matches.

9. The method of claim 7 wherein said step for determining whether there is a match further comprises step for indicating a match if prefixes of keywords in said input keyword string match prefixes of keywords in a keyword string of said database.

10. The method of claim 7 wherein said step for determining whether there is a match further comprises step for indicating a match if at least one keyword prefix in said input keyword string matches a corresponding keyword prefix in a keyword string of said database.

11. A program storage device readable by a machine, embodying a program of instructions executable by the machine to perform a method for initializing a wireless user device, the method comprising:
    receiving an initialization request;
    creating a keyword string database including one or more keyword strings comprising one or more keywords comprising one or more characters, said one or more keyword strings representing the name of an object or the attributes of an object associated with a service;
    creating a resource locator template database including one or more entries comprising a service name and a resource locator template; and
    providing the keyword string database and the resource locator template database in response to said initialization request.

12. A program storage device readable by a machine, embodying a program of instructions executable by the machine to perform a method for browsing a data communications network using one or more tokens, the method comprising:
    receiving an input keyword string from a user, said input keyword string comprising one or more keywords comprising one or more characters;
    determining whether there is a match between said input keyword string and a database of keyword strings;
    determining a category of said keyword string;
    rendering to said user at least one service identifier associated with said category;
    receiving a user-selected service identifier in response to said rendering;
    substituting at least one variable in a resource locator template associated with said service with a string based at least in part on the keyword string entered by the user; and
    launching said resource locator.

13. The program storage device of claim 12 wherein said determining whether there is a match further comprises indicating a match based on incomplete input when further input cannot reduce the number of possible matches.

14. The program storage device of claim 12 wherein said determining whether there is a match further comprises indicating a match if prefixes of keywords in said input keyword string match prefixes of keywords in a keyword string of said database.

15. The program storage device of claim 12 wherein said determining whether there is a match further comprises indicating a match if at least one keyword prefix in said input keyword string matches a corresponding keyword prefix in a keyword string of said database.

16. An apparatus for initializing a wireless user device, the apparatus comprising:
    means for receiving an initialization request;
    means for creating a keyword string database including one or more keyword strings comprising one or more keywords comprising one or more characters, said one or more keyword strings representing the name of an object or the attributes of an object associated with a service;
    means for creating a resource locator template database including one or more entries comprising a service name and a resource locator template; and
    means for providing the keyword string database and the resource locator template database in response to said initialization request.

17. An apparatus for browsing a data communications network using one or more tokens, the apparatus comprising:
    means for receiving an input keyword string from a user, said input keyword string comprising one or more keywords comprising one or more characters;
    means for determining whether there is a match between said input keyword string and a database of keyword strings;
    means for determining a category of said keyword string;
    means for rendering to said user at least one service identifier associated with said category;
    means for receiving a user-selected service identifier in response to said rendering;
    means for substituting at least one variable in a resource locator template associated with said service with a string based at least in part on the keyword string entered by the user; and
    means for launching said resource locator.

18. The apparatus of claim 17 wherein said means for determining whether there is a match further comprises means for indicating a match based on incomplete input when further input cannot reduce the number of possible matches.

19. The apparatus of claim 17 wherein said means for determining whether there is a match further comprises means for indicating a match if prefixes of keywords in said input keyword string match prefixes of keywords in a keyword string of said database.

20. The apparatus of claim 17 wherein said means for determining whether there is a match further comprises means for indicating a match if at least one keyword prefix in said input keyword string matches a corresponding keyword prefix in a keyword string of said database.

21. An apparatus for initializing a wireless user device, the apparatus comprising:
    a memory for storing one or more keyword strings comprising one or more keywords comprising one or more characters, said one or more keyword strings representing the name of an object or the attributes of an object associated with a service; and
    a service provider configured to:
        receive an initialization request;
        create a keyword string database including one or more keyword strings comprising one or more keywords comprising one or more characters, said one or more keyword strings representing the name of an object or the attributes of an object associated with a service;
        create a resource locator template database including one or more entries comprising a service name and a resource locator template; and
        provide the keyword string database and the resource locator template database in response to said initialization request.

22. An apparatus for browsing a data communications network using one or more tokens, the apparatus comprising:
    a user interface configured to receive an input keyword string comprising one or more keywords comprising one or more characters;
    a matcher in communication with said user interface and configured to:
        determine whether there is a match between said input keyword string and a database of keyword strings; and
        determine a category of said keyword string;
    a menu constructor configured to render to said user via said user interface at least one service identifier associated with said category; and
    a resource locator populator configured to:

receive via said user interface a user-selected service identifier in response to said rendering;

substitute at least one variable in a resource locator template associated with said service with a string based at least in part on the keyword string entered by the user; and provide said resource locator to said user interface to launch said resource locator.

23. The apparatus of claim 22 wherein said matcher is further configured to indicate a match based on incomplete input when further input cannot reduce the number of possible matches.

24. The apparatus of claim 22 wherein said matcher is further configured to indicate a match if prefixes of keywords in said input keyword string match prefixes of keywords in a keyword string of said database.

25. The apparatus of claim 22 wherein said matcher is further configured to indicate a match if at least one keyword prefix in said input keyword string matches a corresponding keyword prefix in a keyword string of said database.

* * * * *